United States Patent [19]

Kreten et al.

[11] Patent Number: 5,600,639
[45] Date of Patent: Feb. 4, 1997

[54] BROADCAST METHOD FOR SIMULTANEOUS SWITCHING OF AN ANNOUNCEMENT TO A PLURALITY OF SUBSCRIBERS OF A COMMUNICATION SYSTEM

[75] Inventors: Axel Kreten, Pchheim; Klaus Leutner, Unterhaching, both of Germany

[73] Assignee: Siemens Aktiengesellschaft, Munich, Germany

[21] Appl. No.: 311,928

[22] Filed: Sep. 26, 1994

[30] Foreign Application Priority Data

Sep. 24, 1993 [DE] Germany .......................... 43 32 637.4

[51] Int. Cl.⁶ ................................ H04J 3/02; H04Q 3/42
[52] U.S. Cl. ......................... 370/259; 370/360; 370/432; 379/49; 379/88; 379/269
[58] Field of Search .................................... 370/54, 55, 56, 370/58.1, 58.2, 58.3, 61, 62, 63, 68.1, 110.1; 379/45, 48, 49, 67, 68, 88, 89, 201, 258, 268, 269, 291, 335, 418; 455/3.1, 4.1, 4.2

[56] References Cited

U.S. PATENT DOCUMENTS

| | | | |
|---|---|---|---|
| 3,673,344 | 6/1972 | Smith et al. | 379/72 |
| 4,357,493 | 11/1982 | Anderson et al. | 379/72 |
| 4,694,452 | 9/1987 | Beckinger et al. | 370/58.2 |
| 4,694,487 | 9/1987 | Chang et al. | 379/269 |
| 4,853,957 | 8/1989 | Seeger et al. | 370/58.2 |
| 4,873,694 | 10/1989 | Schmidt et al. | 370/58.1 |
| 5,056,086 | 10/1991 | Libonati | 370/62 |
| 5,390,171 | 2/1995 | Storm | 370/58.2 |

FOREIGN PATENT DOCUMENTS

| | | |
|---|---|---|
| 2578373 | 9/1986 | France . |
| 2588436 | 4/1987 | France . |
| 2123227 | 11/1972 | Germany . |

OTHER PUBLICATIONS

Japanese Abstract, "Broadcasting Device Connection Control System for Digital Exchange", vol. 15, No. 465, (E-1138), JP3201855, Sep. 1991.
Japanese Abstract, "Voice Reply Device Start System", vol. 17, No. 456, (E-1418), JP5103100, Apr. 1993.
H. Beckh, "Vermittlungstechnische EWSD-Teilnehmer--leistungsmerkmale", Siemens Telcom Report, 10 1987 Jan./Feb., No. 1, pp. 18–22.
W. Udo, "Technik des Fernsprechansagedienstes", Jan. 31, 1978, No. 3, pp. 80–85.

*Primary Examiner*—Alpus H. Hsu
*Attorney, Agent, or Firm*—Hill, Steadman & Simpson

[57] ABSTRACT

A broadcast method for simultaneously switching an announcement to a plurality of subscribers of a communication system is provided. Given announcements that are to be disseminated according to the broadcast method of the invention, a call should be switched such that a subscriber hears the announcement from the beginning. In order to meet this demand, call requests for an announcement are inventively collected and are simultaneously through-connected after the expiration of the collecting time.

4 Claims, 1 Drawing Sheet

BROADCAST METHOD FOR SIMULTANEOUS SWITCHING OF AN ANNOUNCEMENT TO A PLURALITY OF SUBSCRIBERS OF A COMMUNICATION SYSTEM

BACKGROUND OF THE INVENTION

Field of the Invention

The present invention is directed generally to communications systems and more specifically to a broadcast method for simultaneous switching of an announcement to a plurality of subscribers of a communication system.

Description of the Related Art

In communication systems, the following two methods are known for switching announcements having a fixed text (standard announcements). In one method, announcements are switched in the broadcast method without time-adjusted employment. A plurality of subscribers are thereby connected to the same announcement port. Up to a prescribable, maximum plurality of further subscribers are arbitrarily added to the running announcement according to the set up of the connection. The maximum listening duration is realized per announcement connection via a call-time limitation.

The other method is operated without broadcasting. In this method only a single subscriber is connected to an announcement port at any time. The announcement is started with the seizure of the announcement port. As a result thereof, the subscriber always hears the announcement from the beginning. The listening time can be a certain number of complete runs of the announcement.

SUMMARY OF THE INVENTION

It is an object of the present invention to provide a method for through-connecting announcements such that every subscriber hears the announcement from the beginning.

The object of the present invention is inventively achieved in a broadcast method for simultaneously switching an announcement to a plurality of subscribers of a communication system, the method having the steps of allocating a collecting time span to an announcement port via which an announcement is sent, collecting call requests from subscribers for an announcement which arrive within the collecting time span of the announcement port, and after the expiration of the collecting time span, through-connecting an appertaining announcement port to each subscriber from which a call request among the collected call requests was received.

A further embodiment of the invention provides a broadcast method having a further step of allocating a collecting time span to an announcement port via which an announcement is sent by allocating a plurality of collecting time spans to a plurality of announcement ports, the plurality of announcement ports having the same announcement such that the collecting time spans of the announcement ports do not chronologically overlap. As a result of this embodiment, the maximum waiting time of a subscriber given a requested announcement is reduced corresponding to the number of existing announcement ports.

A further embodiment of the invention provides a broadcast method having further steps of providing a communication system having a central switching network that is centrally-controlled by a coordination processor, and having a plurality of line trunk groups that form interfaces of subscriber ports, trunk ports and service ports to channels of the central switching network and that are each respectively controlled by an A-side group processor, independently through-connecting by the A-side group processor, a call request to that channel of the central switching network via which the announcement is through-connected, and the coordination processor informing the group processor of the through-connect point in time to a common announcement port identified for an announcement request. This embodiment assures that with a switching system of the given type, message bursts due to a plurality of simultaneous through-connect requests to the group processors participating in a through-connection to an announcement port at the through-connect time are avoided.

Preferred embodiments of the present invention shall be set forth in greater detail below with reference to the drawings.

DETAILED DESCRIPTION OF THE PREFERRED EMBODIMENTS

Figure 1:
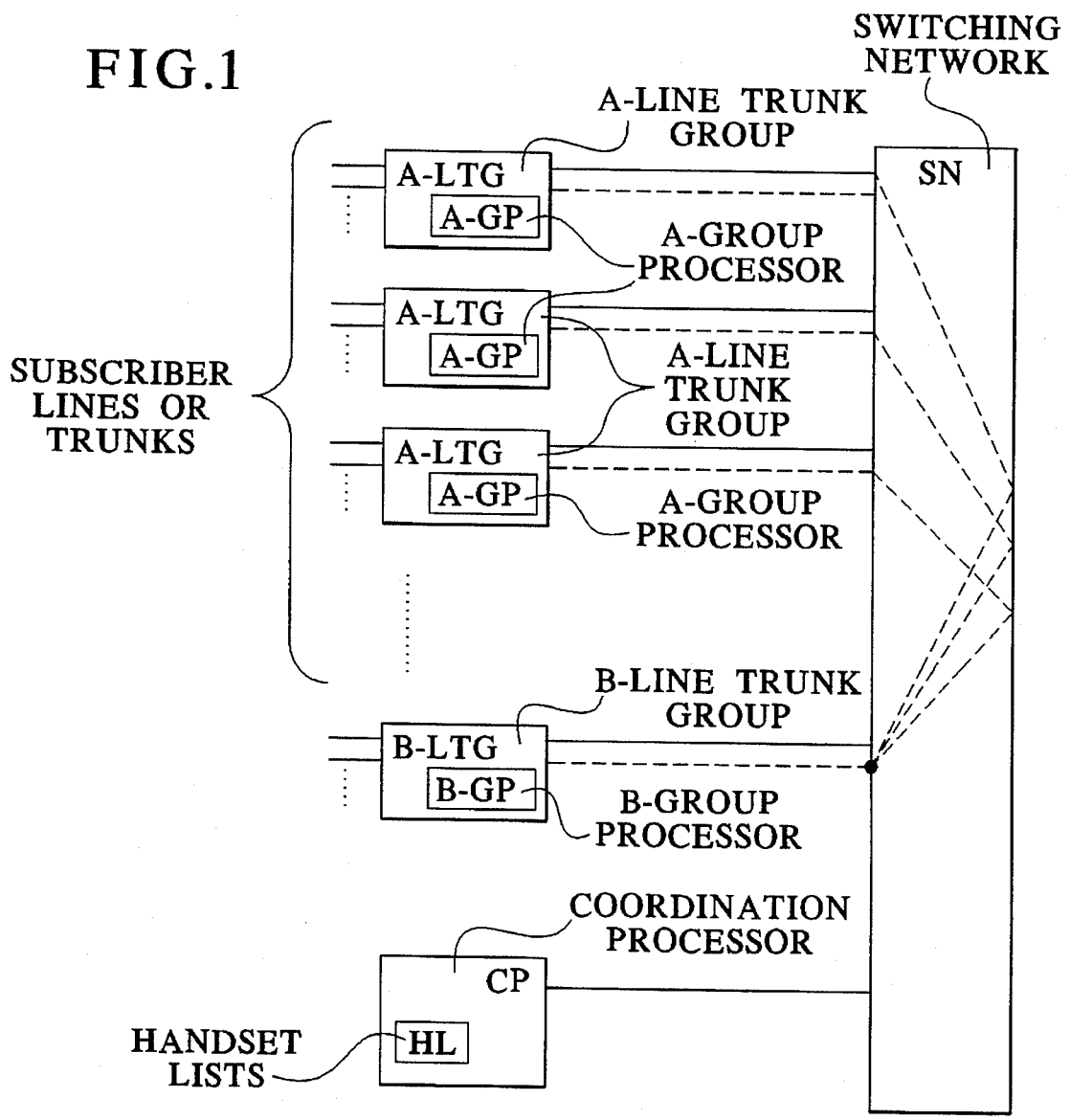
FIG. 1 shows a call structure in a switching system for an announcement according to the broadcast method of the present invention.

The switching system of FIG. 1 has a central switching network SN that is controlled by a coordination processor CP. A plurality of line trunk groups LTG are connected to the switching network SN, these line trunk groups LTG forming the interface from subscriber line ports, trunk line ports as well as service ports (for example, announcement ports) to the central switching network SN. The LTG are independently controlled by a group processor GP in each LTG and have an absolute time of day under their command. The independent clock of the group processor is synchronized every night by the central coordination processor CP. The clocks run with high precision but can only be conditionally set exactly for accuracy. This conditional adjustability derives because of a time grid in seconds and because of the running times of the synchronization commands from the coordination processor to the group processor. The clocks of the group processors are therefore slow (never fast) on the order of magnitude of up to approximately two seconds. An error of a maximum of one second occurs due to the time grid in seconds and occurs in the same size at all line trunk groups. A further error of a maximum of one second arises due to running times of the synchronization commands. The above errors lead to time differences between the clocks of the various line trunk groups. The difference between two line trunk groups, however, does not exceed a maximum error of one second, since only the error conditioned by the running time of the synchronization commands enters in under the line trunk groups. The absolute time of day of the announcement line trunk group can thus be used for communicating the through-connect time of the announcements to the connection side of the subscribers, i.e. in the line trunk groups of the subscribers.

In order to allow the announcement to be utilized time-adjusted in the inventive broadcasting of announcement calls, the call requests for announcements must always be collected for a specific time before they are through-connected to an announcement port in the broadcasting method.

Figure 2:
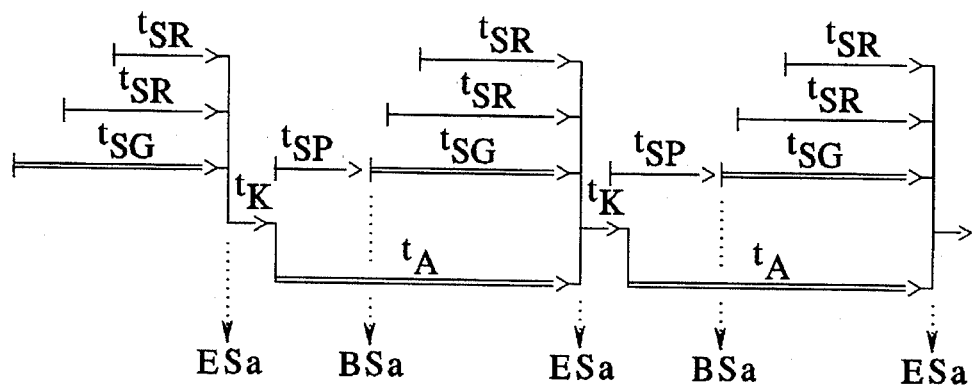
FIG. 2 shows the chronological sequence when broadcasting announcement calls with time-adjusted through-connection in the present invention.

FIG. 2 shows the chronological sequence of the broadcast method of the present invention. A plurality of time spans shown in FIG. 2 must be distinguished. First, an overall collecting time $t_{SG}$ that corresponds to the maximum waiting time for a specific announcement is shown. The line trunk group that has the announcement ports present for the announcement are informed of the total collecting time $t_{SG}$ by administration. Then a remaining collecting time $t_{SR}$ that corresponds to that portion of the total collecting time that remains for a call from the request up to the end of the total collecting time of an announcement port is shown. During the total collecting time (collecting time span), call requests for an announcement port are collected and allocated thereto until the maximum number of allocatable calls to an announcement port (broadcast factor) has been reached.

Call requests arising during the collecting time span are not through-connected in a subscriber-side (A-side) line trunk group and the appertaining subscribers hear a ringing tone. A call request entering outside this collecting time span is allocated to a different announcement port. The announcement request falls within the collecting time span thereof, until the maximum number of listeners (broadcast factor) prescribed by the listener list thereof has been reached. When an allocation is not possible under these conditions, then an announcement request entering outside the collecting time span of an announcement port is also allocated to the announcement port when the listener list thereof is not yet full. For this announcement request, the remaining collecting time is lengthened beyond the total collecting time. The time-adjusted start, however, is also preserved in the case of this announcement request. This latter case should only seldom occur given announcements whose defining data (plurality of announcement ports, broadcast factor, announcement length, and total collecting time) are properly matched to one another.

The collecting time span $t_{SG}$ is followed by a nonchargeable time span $t_K$. The nonchargeable time span $t_K$ is intended to assure that the end of the collecting time span $t_{SG}$ always lies before the beginning of the announcement, even when the absolute clock times are not measured at the same location in the switching system. Thus, the synchronization error of the line trunk groups relative to one another must be taken into consideration.

The nonchargeable time span $t_K$ is followed by an announcement time span $t_A$ (the duration of the announcement). The announcement time span $t_A$ corresponds to a time span from the start up to the end of the announcement or, respectively, to a time span between start message and end message given continuously running announcements.

An inhibit time span $t_{SP}$ corresponds to a time span that lies within the announcement time span $t_A$ and also outside the collecting time span ($t_{SP}+t_{SG}=t_A$). Apart from the special instance that was already set forth, call requests are allocated to an announcement port with an ongoing announcement only during the collecting time span allocated thereto. In addition, a point in time referenced BSa corresponds to the start/restart of a collecting time span $t_{SG}$. A point in time referenced ESa corresponds to the end of a collecting time span $t_{SG}$.

The sequence during the set up of a broadcast call of the present invention shall be set forth in greater detail below. As an example, a comparison to a sequence during the set up of a normal two-party call can be useful. For example, the book "Digitale Kommunikationsnetze" by Peter R. Gerke, Springer-Verlag Berlin, 1991 (pp. 187–190) discloses a detailed presentation of the sequence during the set up of a normal two-party call in a switching system structure according to FIG. 1.

An occupation in a "steady state" of the announcement system of the present invention shall be considered first. In an embodiment of the invention, an occupation in the "steady state" means that all announcement ports of an announcement bundle (announcement ports having the same announcement) are active (i.e., the announcements are adjacent at the announcement port), and that the announcement ports belonging to an announcement bundle are chronologically rastered with respect to the start of their announcement so that requests can be through-connected with minimum waiting time (see below). This "steady state" of an announcement bundle remains in force regardless of whether calls are through-connected to an active announcement port of such a bundle or not.

In the steady state, the announcement line trunk groups send the messages, M:BSa (start of the collecting time) and M:ESa (end of the collecting time) to the coordination processor after every period of the announcement duration. The message M:BSa respectively contains the current listening duration of the announcement and the absolute point in time ESa at which the subscribers allocated to this announcement port are through-connected. With the reception of the message M:BSa belonging to a specific announcement port, the collecting time span within which the coordination processor enters newly arriving announcement requests into the listener list of this announcement port begins for this announcement port.

An announcement request in the steady state proceeds as follows. First, the announcement request is entered into the appertaining listener list and the route is through-connected in the switching network. The A-side then receives the command "through-connect", which contains the signaling information "broadcast with time-adjusted start" and the specification of the times present in the coordination processor, namely the absolute through-connect time and the listener duration of the announcement for the appertaining announcement port. The B-side (announcement line trunk group) receives only a command "seize B" (seizure and through-connection) when a first call is again through-connected to a free, activated announcement port, so that the voice channel can be through-connected to the switching network.

Further announcement requests are handled in the same way until the coordination processor receives the message "end of the collecting time" for this listener list or until the listener list is full. After the occurrence of one of these two conditions, the coordination processor reflects the next announcement port for the next request.

After the expiration of their respective remaining collecting times, the line trunk groups of the subscribers waiting for the same announcement disconnect the ringing tone and through-connect the subscriber port to the channel of the central switching network. After the expiration of the total collecting time, the line trunk group of the announcement port starts the nonchargeable time and sends the message "end of the collecting time" to the coordination processor. The nonchargeable time neutralizes the above-explained differences in the clock time between announcement line trunk group and the line trunk groups of the A-side. The announcement line trunk group starts the announcement after the expiration of the nonchargeable time. After the expiration of the inhibit time $t_{SP}$, the announcement line trunk group sends the message "restart of the collecting time" to the coordination processor.

In order to shorten the maximum possible waiting time of a subscriber for the beginning of an announcement, a chronological rastering of the existing announcement ports having the same announcement is necessary. The term "chronological rastering" is the chronologically-offset start of identical announcements at different announcement ports, which assures that a request can always be through-connected with a waiting time that is short in comparison to the listening time of the announcement. There are three possible procedures to achieve this condition.

A first procedure provides that upon activation and establishment of an announcement line trunk group by the coordination processor, the first announcement port is started on the basis of a special start message to this line trunk group. As datum, this start message also contains the (relative) collecting time that is administratively prescribed. The announcement line trunk group then measures the announcement length (start/stop signals of the announcement machine) and calculates the timing data therefrom that are necessary for the messages M:BSa and M:ESa. The calculation of these timing data shall be set forth in greater detail later. At point in time BSa for the first announcement port, the coordinator processor sends the start messages to the second announcement port. An announcement port started in this way subsequently always remains in the active condition. Requests arriving during the activation procedure can only be conditionally handled (ports must already be active and the appertaining listener list must still have space. Requests outside of this are rejected).

A second possible procedure fundamentally corresponds to the first procedure; however, the first announcement request is used to trigger activation. Also in this procedure, once activated announcement ports always remain active.

A third possible procedure fundamentally corresponds to the second procedure; however, the announcement ports in this procedure only remain active as long as there is still at least one call to a respective announcement port. Since, by contrast to the first and second procedures, the ports are often inactive in this third procedure, and precautions must be implemented (additional messages) so that announcement requests need not be unnecessarily often rejected.

The control of allocation of announcement requests to active announcement ports shall be set forth in greater detail below. In broadcast announcements without the time-adjusted start of the invention, the announcement requests are uniformly distributed onto all existing announcement ports having the same announcement (announcement bundles). The coordination processor CP (see FIG. 1) manages a pointer per announcement bundle that is incremented to the respectively next announcement port at every request. Handset listener lists HL are present in the coordination processor CP. When a listener list is full, then the appertaining port is disengaged from the appertaining port.

Given broadcast announcements having the time-adjusted start of the invention, the pointer remains at an announcement port until this port switches into the inhibited condition. An announcement port enters the inhibited condition when the coordination processor receives the message M:ESa for this port from the announcement line trunk group. The message M:ESa contains the absolute point in time ESa measured by the announcement line trunk group. After this, the position of the pointer is modified such that it points to the next port that is not in the inhibit condition or, respectively, to the next port for which the waiting time is minimal. When there is currently no connection to subscribers for this announcement port (the listener list is empty), then the port receives the command "seize B". The command "seize B" to the announcement line trunk groups also contains the absolute point in time ESa of the announcement port which precedes in the search sequence in this case. At the same time, that point in time occurs when the collecting time of the newly seized announcement port is the point in time BSa. When the two absolute points in time ESa and BSa do not coincide, the announcement line trunk group can resynchronize the announcement machine of the new announcement port in the next period, i.e. can correspondingly shift the start of the message. The time-adjusted start of the announcements is also preserved given unfavorable rastering.

The announcement bundle must be established with a fixed search sequence so that the arising sequence remains preserved in the time rastering. The time calculations in an announcement line trunk group shall be set forth in greater detail below.

For an announcement line trunk group to correctly control the collecting and listening time spans, it must know the times $t_A$, $t_{SG}$, $t_{SP}$, $t_K$ (see FIG. 2). The nonchargeable time $t_K$ is prescribed as a system quantity (1–2 seconds). The total collecting time $t_{SG}$ is administered via the coordination processor and is dependent on how long the announcement time $t_A$ is and on how many identical announcement ports are available (chronological offset of the individual announcements).

An announcement line trunk group must evaluate the collecting time in order to be able to inhibit and release the listener list in the coordination processor via the aforementioned messages M:ESa and M:BSa. In order to calculate the absolute point in time BSa, the announcement line trunk group needs the inhibit time $t_{SP}$. This inhibit time can be calculated from $t_A$- $t_{SG}$. Further, the announcement line trunk group must calculate the through-connect point in time for the through-connection of the A-side. This point in time is calculated by identifying the point in time of the stop signal of the announcement machine and the addition of the times $t_K$ and $t_A$.

Although other modifications and changes may be suggested by those skilled in the art, it is the intention of the inventors to embody within the patent warranted hereon all changes and modifications as reasonably and properly come within the scope of their contribution to the art.

We claim:

1. Broadcast method for simultaneously switching an identical announcement to each of a plurality of subscribers of a communication system having a central switching network that is centrally-controlled by a coordination processor and having a plurality of line trunk groups that form interfaces of subscriber ports, trunk ports and service ports to channels of said switching network and that are each respectively controlled by an A-side group processor, said method comprising the steps of:

allocating a collecting time span for said identical announcement to a single announcement port via which said identical announcement is sent;

collecting call requests from a plurality of subscribers for said one announcement, said call requests arriving within said collecting time span of said announcement port;

independently through-connecting a call request via said A-side group processor to that channel of said central switching network via which the announcement is through-connected;

informing said group processor of the through-connect point in time to a common announcement port identified for an announcement request via said coordination processor; and after the expiration of said collecting time span, through-connecting said one announcement port to each subscriber in said plurality of subscribers from which said collected call requests were received within said collecting time span.

2. Broadcast method according to claim 1, further comprising the step of: through-connecting a ringing tone to said requesting subscribers during said collecting time span.

3. Broadcast method according to claim 1, wherein said step of allocating a collecting time span to a single announcement port via which one announcement is sent is further defined by allocating a plurality of collecting time spans to a plurality of announcement ports, said plurality of announcement ports having the same announcement such that said collecting time spans of said announcement ports do not chronologically overlap.

4. Broadcast method according to claim 3, further comprising the step of:

selecting an announcement port that has the next-successive collecting time for further call requests to the same announcement when a specific maximum plurality of call requests collected during said collecting time span of an announcement port has been reached.

* * * * *